Aug. 2, 1927.
T. K. A. NORDENSSON
PRESSURE METER
Filed Aug. 16, 1926
1,637,653
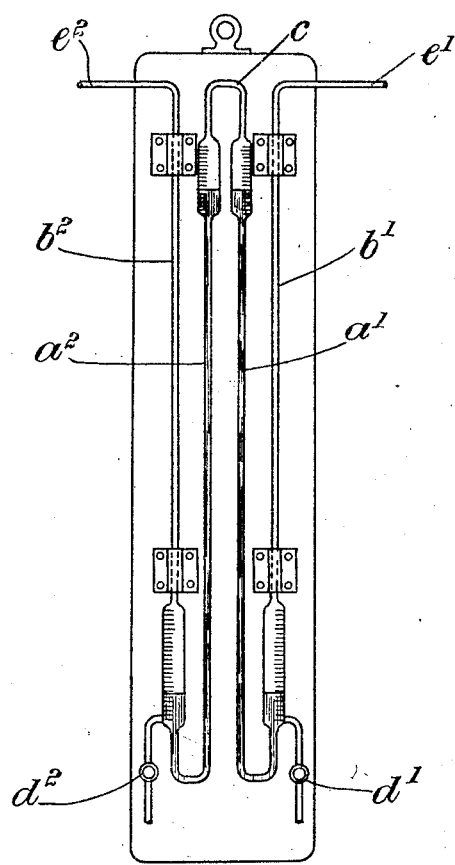

Patented Aug. 2, 1927.

1,637,653

UNITED STATES PATENT OFFICE.

TOM KNUT ARFVED NORDENSSON, OF GLASGOW, SCOTLAND.

PRESSURE METER.

Application filed August 16, 1926, Serial No. 129,605, and in Germany August 19, 1925.

On measuring pressures, especially such below the atmospheric pressure, it has hitherto been necessary to use two separate devices, one for measuring the pressure in question in relation to the atmospheric pressure and the other for measuring the atmospheric pressure itself, or one device for measuring the absolute pressure has been used, such device consisting of a Toricelli's pipe or a so called barometric pipe in which an absolute vacuum prevails. In the latter case, however, it is not possible to ascertain, whether an absolute vacuum prevails in the device or whether the pressure therein is so low that it may be neglected. Often a small quantity of air is contained in the vacuum pipe of the apparatus causing incorrect measuring results.

The present invention has for its object to provide a device consisting of only one unit and where the vacuum prevailing in the apparatus can be ascertained and measured at any moment. To this end, the pressure-meter according to the invention consists of two barometric pipes containing liquid and connected with each other at the vacuum side in such a manner as to form a common vacuum chamber.

The invention is illustrated in the accompanying drawing by way of example. Secured on a board there are two similar barometers $a_1$, $b_1$ and $a_2$, $b_2$, each containing a liquid, for instance mercury. The shanks $a_1$ and $a_2$ are connected with each other at the vacuum side as at $c$. The shanks $a_1$ and $a_2$ are widened at the top and the shanks $b_1$ and $b_2$ widened at the bottom at the places of the liquid levels. The shanks $b_1$ and $b_2$ which do not necessarily extend very far upwards are provided at the bottom with outlet cocks $d_1$ and $d_2$ respectively. The instrument is provided with scales at the widened parts and the volume of the vacuum space is also indicated.

If, for instance, a pressure below the atmospheric pressure is to be measured by means of the instrument, one of the connections $e_1$ or $e_2$ is connected to the measuring point and the prevalent pressure is read off as the difference in head between the liquid levels in the shanks $a$ and $b$ of the barometer in question. In effecting this measurement the liquid levels in the two shanks of the other barometer remain unchanged, disregarding the very small influence on said levels of the vapor in the chamber $c$. If, however, the said liquid levels show a perceptible change, this is indicative of a pressure pervailing in the vacuum chamber that cannot be neglected, and the measurement carried out must be correspondingly corrected, which may be easily performed simultaneously with the measurement, as the volume of the vacuum chamber is known. Therefore, the present instrument has the advantage, as compared with other instruments of this type, that it is possible on each measurement to ascertain that the measured value is correct, and that a satisfactory vacuum may always be brought about in the vacuum chamber in a manner to be set forth in the following.

On filling the pressure-meter with liquid, it should be observed that moisture and air must not enter the instrument under any circumstances. For this reason, this filling of the instrument is preferably carried out in the following way. The instrument is placed on the longitudinal edge of the board, and one of the connections, for instance $e_2$, is connected with a calcium chloride tube by means of a shut-off device, the pipes being then evacuated and heated. Moisture that may be present in the tubes will then evaporate and is drawn off for the most part by the vacuum generator. Then the connection with the $CaCl_2$-pipe is established, and air is sucked through said pipe and the instrument, while preferably maintaining the heating of the barometric pipes. Then the $CaCl_2$-pipe is replaced by a mercury container, and mercury is slowly sucked into the barometric pipes under continued heating of the instrument. The sucking in of the mercury should be carried out slowly enough to permit of maintaining a good vacuum in the instrument during the filling in of the mercury. After the instrument has been filled with mercury it is slowly lifted up into an upright position, and surplus of mercury is tapped off through one or both of the cocks $d_1$ and $d_2$, the mercury columns in the shanks $a_1$ and $a_2$ will then divide at the highest point, thus forming the vacuum chamber $c$. If it proves on measuring that the vacuum in the vacuum chamber $c$ is not good enough, the mercury may be tapped off at any moment, and the instrument again filled in the manner set forth above so that a satisfactory vacuum is obtained. It is also evident that the vacuum in the chamber $c$ will not be influenced by air that may leak through the cocks $d_1$ and $d_2$ during the measurement, as such air will flow upwards in the outer shanks $d_1$ and $d_2$ and is drawn off therefrom.

According to the uses the instrument is to be applied to, the design of the same may vary. For instance, the widened portions may be disposed in the middle of the pipes. On measuring vacuums the pipes are preferably over 800 millimeters in length, that is to say, the pipes are substantially in the form of common siphon barometers. It is evident that after determining the magnitude of the vacuum in the chamber $c$ the two halves of the instrument may be used for measuring the same or different pressures.

What I claim is:—

Pressure-meter, especially for measuring vacuums, comprising two barometers of the liquid type the pipes whereof containing the counterbalancing liquid columns are connected with each other at the vacuum side so as to form a common vacuum chamber.

In testimony whereof I affix my signature.

TOM KNUT ARFVED NORDENSSON.